US008677680B2

(12) United States Patent  (10) Patent No.: US 8,677,680 B2
Schuster  (45) Date of Patent: *Mar. 25, 2014

(54) FIRE ANT SUPPRESSION SYSTEM

(75) Inventor: Bruce Schuster, Alvarado, TX (US)

(73) Assignee: Bruce Schuster ( * ) Notice: Subject to any disclaimer, the term of this patent is extended or adjusted under 35 U.S.C. 154(b) by 539 days.

This patent is subject to a terminal disclaimer.

(21) Appl. No.: 12/886,728

(22) Filed: Sep. 21, 2010

(65) Prior Publication Data

US 2012/0066961 A1  Mar. 22, 2012

Related U.S. Application Data

(63) Continuation-in-part of application No. 11/225,796, filed on Sep. 13, 2005, now Pat. No. 7,797,878.

(51) Int. Cl.
A01M 19/00 (2006.01)
(52) U.S. Cl.
USPC .............................................. 43/130; 43/129
(58) Field of Classification Search
USPC ........................................ 43/130, 129, 132.1
See application file for complete search history.

(56) References Cited

U.S. PATENT DOCUMENTS

| 1,037,623 | A | * | 9/1912 | Hinsky | 43/130 |
| 1,727,995 | A | * | 9/1929 | Lechler | 43/129 |
| 2,117,419 | A | * | 5/1938 | Hamrick et al. | 392/403 |
| 5,031,355 | A | * | 7/1991 | Ryan | 43/130 |
| 5,109,629 | A | * | 5/1992 | King et al. | 43/132.1 |
| 5,319,878 | A | * | 6/1994 | Moffett et al. | 43/124 |
| 5,870,852 | A | * | 2/1999 | Stanley | 43/130 |

* cited by examiner

Primary Examiner — Christopher P Ellis

(57) ABSTRACT

The present disclosure illustrates a method, apparatus and system for treating fire ant mounds. One or more aspects comprise a pressure vessel for holding water and steam, a water-heating circuitous pipe network for heating water and a steam-heating circuitous pipe network for heating steam. A heat source contemporaneously heats the water-heating circuitous pipe network, the steam-heating circuitous pipe network and the pressure vessel. Steam is generated, superheated and is supplied to a probe for applying steam to fire ant mounds. A nozzle containing counter-sunken ports may be attached to the probe. A sliding hammer to aid insertion and extraction may be fixed to the probe. An articulated protective shroud attached to the probe remains in contact with the ant mound surface.

17 Claims, 11 Drawing Sheets

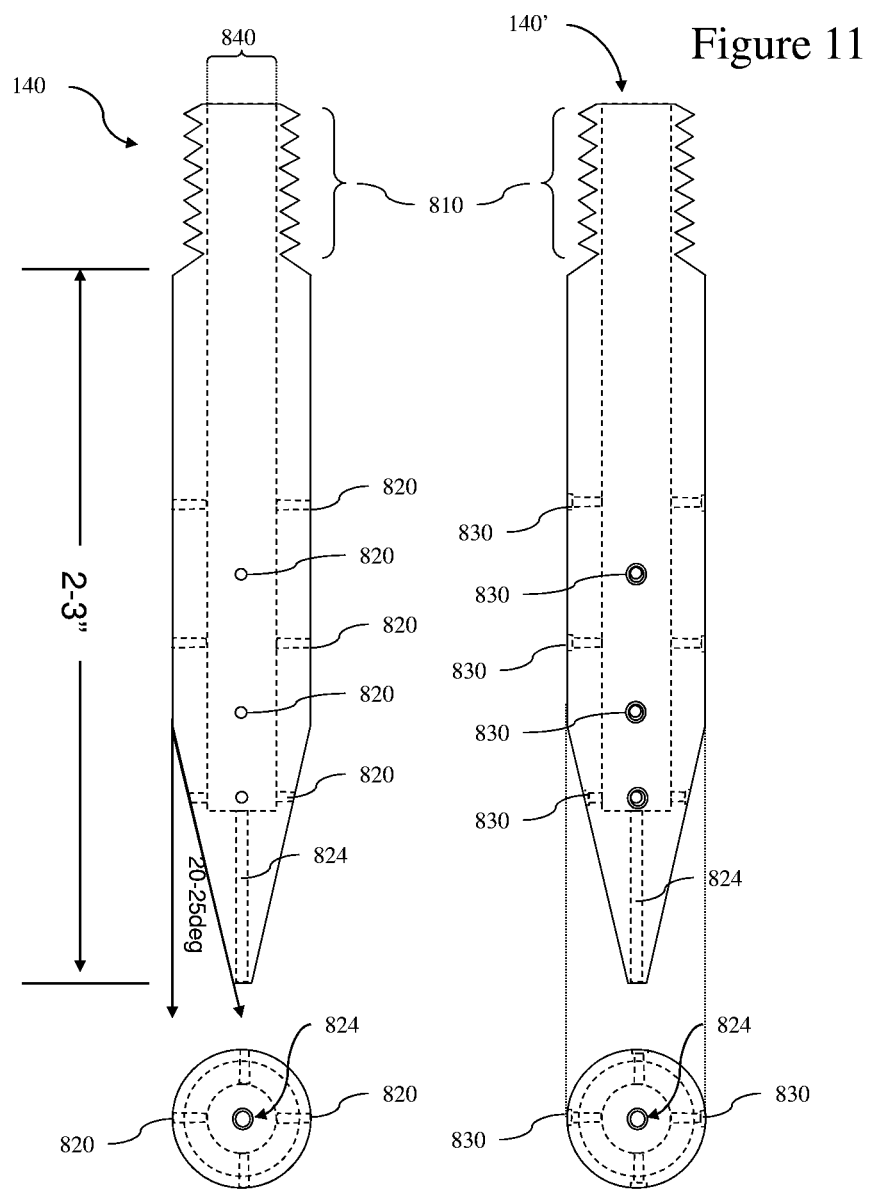

FIRE ANT SUPPRESSION SYSTEM

CROSS-REFERENCE TO RELATED APPLICATION

This application is a Continuation-in-Part of U.S. Utility application Ser. No. 11/225,796 filed 13 Sep. 2005, now U.S. Pat. No. 7,797,878.

BACKGROUND OF THE INVENTION

1. Field of the Invention

The present invention relates to a method, apparatus and system for eliminating fire ant infestations.

2. Description of the Related Art

Fire ant infestation is a major agricultural and lifestyle-inhibiting problem. It costs the agricultural industry billions of dollars in terms of crop loss, damage, and death to livestock. In more residential environments they are at best a nuisance and in certain cases, a health threat. In this environment they are also highly destructive to structures, dwelling places and electrical installations.

There are two types of imported fire ants. First is the Black fire ant that was imported around 1918 into Mobile, Ala. from South America. Their presence is generally limited to Mississippi and Alabama. Whereas the more pervasive Red Fire ant exists predominately in the South ranging from Florida to New Mexico, with some isolated colonies in Arizona, Nevada, and California, and as far North as Tennessee and South Carolina. Ant infestations have damaged agricultural crops, killed livestock, and are surprisingly considered more destructive than termites to dwellings. Infestations have resulted in death, destruction and lost income on the order of billions of dollars over the years since their accidental introduction into the United States in the 1930's.

The predominant population within an ant mound is the worker ants. Populations can easily reach levels of 100,000-500,000. The two other members of the colony are the winged males and the queen. Though mating can occur anytime of the year, it predominantly occurs in the spring and fall. A young queen will leave the mound and fly 2-4 feet above the mound where a winged male joins her in flight and mates. The male soon dies and the female flies to another location where she sheds her wings and begins to form a new colony. This could be as short as a few feet away from the original colony or as far away as ½-1 mile. At the new location the queen will lay approximately 1 dozen eggs which will reach maturity in approximately 1 month. They will then begin to feed the queen which will be able to eventually lay 800 eggs per day. Due to this capability, the queen can easily re-establish a colony with as little as 1-2 dozen worker ants. Therefore it is extremely important to kill the queen, not just the worker ants. The life cycle of the worker ants is generally about five weeks whereas that of the queen can be 7 years or more.

The worker ants are capable of multiple and very painful stings which have resulted in some deaths in hyper-sensitive people and secondary infections in others. They will attack any and all perceived attackers, even those who innocently just stand in close proximity to the mound. Once a threat is perceived the worker ants will immediately whisk the queen away down the multiple pathways and foraging tunnels that exist within the mound. Ants can clear a mound in less than one minute. The mound and subterranean colony itself can reach 4-6 feet deep and be connected to foraging tunnels which run as much as 75-130 feet away from the mound. Therefore in order to prevent re-infestation, the queen must be killed quickly and without alarming the mound. Fortunately the queen's lair lies directly below the top of the mound.

U.S. Pat. No. 5,319,878 to Moffet et al. 'Method and apparatus for extermination of imported fireants' discloses that the extermination of imported fireants is accomplished by a process in which water, heated to a temperature in the range of 200-212 degrees, is applied by impulse inundation within the central core region of a fireant mound, initiated below ground level, continuing as the probe is inserted to a lowermost region, and thereafter continuing as the probe is withdrawn, and repeating the process from different angles and orientations.

The Moffet et al. invention comprises a large cart carrying a 30 gallon water tank, a car or tractor battery, a battery operated hydraulic pump, a boiler and a propane tank. The invention calls for injecting hot water into a fire ant mound via a probe. The invention has several potential drawbacks that make it impractical for residential use. A tractor or ATV is required to move the invention. Capital costs are large because expensive equipment is required and it is costly to build. Vibration and aerial disturbance produced by the invention alarms ant colonies. The invention is not self-contained. A source of electricity or external power is required to operate a high-pressure pump. The invention injects only hot water, which under the force of gravity will move downward instead of in all directions. A preferred embodiment of the invention calls for the addition of a foaming gel. Some users may find the injection probe handle unwieldy; it may require strength to insert. Additionally, the injection probe nozzle is wider than the probe itself. This creates a void space behind the nozzle and thereby creates a flow path through which the heated water can escape out the top of the mound instead of being injected into the mound.

U.S. Pat. No. 6,026,609 to Rawls, 'Hot steam and water fire ant killing device' discloses a mechanical device for killing fire ants by the introduction of hot water and steam to the fire ant mound. The invention uses a hydraulic cylinder to ram a metal probe deep into an ant mound. The probe has a plurality of orifices which emit jets of hot water and steam, thereby scalding and killing the ant queen before she can be removed to safety. In the preferred embodiment, the invention is adapted to be mounted on an agricultural tractor.

The Rawls invention is mounted in a frame to the rear of a tractor. The frame contains a water tank, water heater, and PTO operated pump and injection probe. It uses the tractors hydraulics to insert a probe into the ant mound in order to inject hot water directly into the mound. Potential drawbacks for this invention include aspects that make it impractical for residential use. It requires a tractor. Capital costs are large because expensive equipment is required and it is costly to build. Vibration and aerial disturbance produced by the invention alarms ant colonies prior to insertion of probe, which potentially allows the queen to escape. This invention injects only hot water, not steam as claimed. The claimed steam injection is merely the misting of the hot water as it exits the injection probe ports. This is because the disclosed pump connected to the PTO shaft cannot pump a gas which steam is. It can only pump a liquid.

U.S. Pat. No. 4,756,118 to Evans, 'Method and apparatus for the destruction of imported fire ants of the genus *Solenopsis*' discloses a method and apparatus for the mechanical destruction of members of the genus *Solenopsis*, the South American Fire Ant, by the introduction of intense heat, vapor, insecticides, and/or steam directly into the colony by incorporating the use and application of specific compounds and mixtures of hydrocarbons, pyrethroids, insecticides, oxidizing agents, and/or vaporizing liquids, injected into the individual ant colonies by a variety of methods, including a pressurizing injection gun, with or without a heating attachment. The device is designed to obtain the proper penetration of the Imported Fire Ant colony in order to rapidly and totally infuse the entire chamber area, as well as the lateral foraging tunnels, with a thermal vapor (fog) containing an insecticide known to be lethal to Formicoidea (ants). Additionally, upon cooling, the vapor recondenses into a residue that has a prolonged residual killing effect for continued control purposes. An additional effect of this system is that the mere contact of the superheated vapor is lethal to those ants in the immediate vicinity of the lance so that the system is not totally dependent on insecticidal properties of the active ingredients.

The Evans invention injects high-pressure steam, insecticides, hydrocarbons and other chemicals via a lance. The invention has several potential drawbacks. It relies on dangerously high pressures on the order of 3,000 pounds per square inch and dangerously high temperatures on the order of 2210° Fahrenheit. The invention utilizes insecticides which are harmful to the environment and remain in-situ for up to one year. The required high temperature may reduce the effectiveness or most likely destroy the poison. The invention uses a high-pressure tank containing pressurized gas to develop injection pressure. This must be purchased elsewhere and attached to the system. The invention may be configured for back-pack carrying which is impractical for use by smaller individuals.

U.S. Pat. No. 4,160,336 to Query et al., 'Method for treating fireants' discloses a method and apparatus for treating fireants which combines an insecticide with a refrigerant into a mixture and injects the mixture into the fireant hills. This invention uses a back pack or trailer to carry multiple tanks containing poison and a refrigerant which are injected into the mound with a probe. Potential drawbacks associated with this invention include that it utilizes insecticides which are harmful to the environment, it uses a non-residential poison, and it utilizes a refrigerant, Freon, which is expensive and harmful to the environment.

U.S. Pat. No. 5,054,231, 'Fire ant eradication apparatus and method' to Witherspoon discloses a method for eradicating fire ants that includes connecting a supply of pressurized water to a dispenser handle, forcing water or a water and insecticide mixture out a vertical probe to drench the top of the fire ant mound, then slowly inserting the probe into the fire ant mound with the water or water and insecticide mixture flowing, followed by slowly pulling the probe out of the mound while flooding the mound with the water and insecticide mixture. A dispenser for accomplishing the method includes a handle that may be attached to a source of pressurized water, a bottle attached to the handle containing insecticide, a vertical probe attached to the handle for injecting water and insecticide into a fire ant mound, a conduit to allow water to pass from the pressurized source through the handle and out the probe, and a means of aspirating insecticide into the water flowing through the handle and the probe.

The Witherspoon invention takes water from a garden hose and mixes it with poison, then injects it onto and into the mound with a probe. Potential drawbacks to the invention include insecticides which are harmful to the environment. The invention uses water from a water-hose. Surface tension inherent in water prevents its free flow through the mound. The application on the surface initially before injecting into mound warns the ants and facilitates the escape of queen. As water is heavier than air it will flow down instead of omni-directionally throughout the desired target area.

U.S. Pat. No. 5,109,629, 'Method and apparatus for killing subterranean insects,' to King et al. discloses a system and method for killing ants in a subterranean colony. Liquid insecticide is vaporized in a fogging vaporization chamber by the exhaust of an internal combustion engine such as that mounted on a lawn mower or farm tractor. An insertion probe, having exhaust holes, is connected to an output of the vaporization chamber by a flexible hose. In operation, the probe is inserted into the subterranean colony, whereby vaporized insecticide is applied down in the colony. Such vaporized insecticide travels through passages to various "rooms" of the colony, thereby contacting ants in all parts of the colony.

The King et al. invention uses the exhaust from a lawnmower to vaporize poison, which is then injected into the mound via a probe. Potential drawbacks to this invention include insecticides which are harmful to the environment and a lawn mower which generates noise which in turn scares the fire ants and facilitates the escape of the queen leading to the survival of the colony. Furthermore the heat of the exhaust will at best degrade the effectiveness of the poison and most likely destroy it.

U.S. Pat. No. 4,815,234 to Connolly, 'Method and apparatus for destroying fire ants and fire ant beds,' discloses apparatus for destroying fire ants includes a rotating ant bed destruction member and an apparatus for rotating such destruction member into an ant bed; a fluid delivery assembly is provided for delivering water, ambient or at extremely hot temperatures; or other fluid, to the rotating destruction member to drown and otherwise kill the ants while the rotating destruction member destroys the ant bed. The method of this invention is practiced by simultaneously moving the ant bed destruction member into the bed and delivering a stream of fluid into the ant bed sufficient to co-act with the destruction member to destroy the ant bed.

The Connally invention uses a rotating blade driven by a hydraulic motor which is powered by a riding lawnmower to destroy the ant mound above ground and also allow for the application of hot water to the top of the mound. Potential drawbacks to this invention include that the rotating mechanism connected to a riding lawn mower destroys the ant bed above ground only. It does not kill the queen below. The ant colony will simply relocate. The mechanism simply spreads the ants but doesn't kill them. They will then begin to attack the machine and operators. Noise forewarns the ants and allows the queen to escape. Capital costs are large. The invention requires a riding lawnmower, hydraulic fluid tank and hydraulic motor to drive the rotating mechanism. It also requires a water tank and heating coil to possibly heat up water to be applied to the mound at the surface which adds to the size and cost of the system. The rotating member cuts off passage ways preventing the fluid from effectively reaching below ground level. All of the attachments add to cost, complexity, weight and size.

U.S. Pat. No. 5,031,355 to Ryan, 'Steam arrangement for exterminating the Argentina Fire Ant' discloses an exterminating arrangement for exterminating the Argentina Fire Ant is disclosed. The arrangement includes a holding and pressure tank, a heat exchanger in fluid communication with the holding and pressure tank, a superheater in fluid communication with the heat exchanger, and a dome in fluid communication with the superheater.

The Ryan invention utilizes a trailer mounted heated water supply tank, heated heat exchanger and a super heater to create steam which is then applied to the top of the mound only via a parabolic dome covering the ant mound which is held in place with a strap and cleats. The potential drawbacks of this invention include large capital costs due to all of the components required. The invention requires at least three major components: a 40 gallon Tank, a heat exchanger and a superheater. Additionally it requires three burners, one for each major component. The heat exchanger requires 453 ft of ⅞" OD coil which is heavy and expensive. The large size of the invention, requiring a trailer to carry it on, will disturb and alarm ants potentially leading to the escape of the queen and survivability of the colony. The invention uses a parabolic dome which is pre-installed over the ant mound and held in place with a strap and cleats. Any disturbance of the ant bed prior to application of steam will alarm ant bed allowing the queen to escape. The dome only applies steam at the surface and relies on the ant passage ways to carry the steam 5-8 ft down.

U.S. Pat. No. 5,366,154 to Thompson, 'Apparatus and method for controlling vegetation using high pressure liquid spray,' discloses an apparatus and method for controlling vegetation, as well as insect infestation, as are typically encountered in agricultural environments. The apparatus is characterized by its construction to include a high pressure pump for a liquid spray material which may be applied to vegetation at a pressure from about 100 psi to as much as about 4,000 psi. The apparatus further includes a heater whereby the liquid spray material may be heated to a temperature of from about 100° F. to about 240° F. before it is sprayed. The apparatus is constructed so that it can be attached to a standard tractor for ease of use. The method of this invention is characterized by its utilization of a high pressure spray so that agricultural chemicals in amounts from virtually 0% to about 50% of their current recommended dose rates can be used with efficacy.

The Thompson invention utilizes multiple booms attached to a tractor which carries a mechanism to heat the water and pump the water through the booms. Potential drawbacks to this invention include its large size (for agricultural use), the multiple booms attached to a tractor which creates vibrations and warns the ants, and it is used above ground mainly to control weeds.

U.S. Pat. No. 5,154,018 to Livingston, 'Method and apparatus for killing fire ants,' discloses a method for killing fire ants in subterranean tunnels, includes fogging the subterranean tunnels with an insecticidal amount of thermal aerosol fog through a boot covering the subterranean tunnels and then blowing hot air into the subterranean tunnels whereby the thermal aerosol fog is forced further into the subterranean tunnels. The apparatus used in the method includes a heat generator unit capable of producing thermal fog and a boot with skirt connected to said generator and which covers said subterranean tunnels. A dye may be added to the fog to provide a color marking for each fire ant mound treated by the fog.

The Livingston invention utilizes an internal combustion engine to drive an air compressor. The compressed air is mixed with gasoline or diesel fuel and injected into a combustion chamber. Exhaust gases are mixed with poison and applied to the surface of the ant mound below a shroud. Potential drawbacks include the noise and vibration generation of the internal combustion engine giving ants early warning. The invention uses poisons which have environmental impact. Petroleum products and by-products used to create the fog are hazardous to the environment. The invention requires a trailer to transport entire mechanism which causes vibrations and forewarns ants. The invention is expensive and not for residential use.

U.S. Pat. No. 5,165,199 to Tallon, 'Non-toxic method of exterminating insects,' discloses an invention concerning a non-toxic method of exterminating dry wood termites, fleas, roaches, ants, weevils and the like by utilizing an inert freezing liquid such as liquid nitrogen as the killing agent. The liquid nitrogen is inserted so as to envelop the colony of objectionable organisms until the environment is reduced to a temperature of at least zero degrees Fahrenheit and maintained at that temperature for between 2 to 5 minutes. This method effectively kills the organisms by crystallizing the innards and freezing the cells, thereby eliminating the need for more dangerous and toxic poisons that are currently being used.

The Tallon invention injects liquid nitrogen into the mound. Potential drawbacks to this invention include the overall expense, nitrogen is not easily acquired, the invention requires specialized and expensive equipment.

U.S. Pat. No. 5,378,086 to Campbell, 'Systems to exterminate and control subterranean termites and other subterranean pests,' discloses a system to exterminate and control subterranean termites and other subterranean pests inhabiting a subterranean area surrounding or in close proximity to a structure having a perimeter near ground level and support pads includes a plurality of first pipes, a plurality of second pipes, a source of steam, a plurality of temperature sensors, a temperature display and a controller. Each pipe has a plurality of holes in its sidewall. The first and second pipes are disposed beneath ground level along the perimeter of the structure and along its support pads, respectively. The source of steam is fluidly coupled to the pipes. Each temperature sensor is disposed adjacent to one of the pipes. The temperature sensors generate temperature signals. The temperature display displays a temperature reading of the temperature adjacent to each pipe in response to the temperature signals. The controller regulates pressure and/or temperature of the source of steam in response to the temperature signals.

The Campbell invention is a method that creates a network of underground probes around and under a structure. The probes are either for steam injection or temperature sensing. Both types of probes have temperature sensors that feed information back to a central controller which in turn is connected to a central boiler. The system is permanently installed and periodically raises the temperature around the structure to kill insect and rodent infestations. Potential drawbacks include that it is expensive, requires boiler, network of steam delivery tubes, probes, sensors, and electricity. It is only applicable to area around a structure, not for random infestation of ants in the surrounding grounds. The invention is not designed as a mobile unit to exterminate ants in the yard. The invention requires specialized and expensive equipment. A technician is required to install the invention due to its complicated design and requirements. The invention further requires the digging of a hole which is filled with pea gravel, into which each probe is inserted.

U.S. Pat. No. 5,561,942 to Mungo, 'Fire ant killing device and method,' discloses a hand-portable fire ant killing device for vaporizing liquid resmethrin and infusing vaporized resmethrin throughout a fire ant mound on ground includes a dome, sized for fitting over a fire ant mound to be exterminated, having a top and an interconnected lower lip for contacting the ground entirely around the fire ant mound and for forming a closed interior chamber above the ant mound, a lightweight, high temperature gas discharging device which is mounted on the top of the dome, a high temperature gas discharging manifold directed into the closed interior chamber between the dome and the ant mound, a tank for containing resmethrin without pressurization which is mounted on top of the dome and a metering chamber and conduit which are connected for delivering a predetermined amount of resmethrin by a force overcoming the pressure in the dome for vaporization therein. The vaporized resmethrin in the high temperature gas is discharged under a small positive pressure into the closed interior chamber of the dome for infusion throughout the mound to kill all ant inhabitants.

The Mungo invention uses the exhaust gas from a two-cycle engine to vaporize the poison resmethrin, which in turn is injected into a domed structure sitting on top of a fire ant mound. Potential drawbacks include the use of a poison, which isn't good for the environment. The poison is only applied to the surface of a mound, not quickly and deep down in the mound to contact and kill the queen. The two-cycle engine generates noise and vibrations and alerts the ants allowing them to escape.

U.S. Pat. No. 6,079,149 to Hastings, 'Method and apparatus for the removal and elimination of fire ants,' discloses a liquid bearing member inserted into an ant mound thereby allowing the inundation of the ant mound with a liquid through a liquid bearing member. An evacuation chamber secures over the ant mound, thereby allowing the capture of the liquid within the evacuation chamber. Upon inundating the ant mound with the liquid, the liquid level rises in the evacuation chamber to a level elevated above the surface of the ant mound. The ants and ant larvae, in accordance with their survival instincts, rise to the top level of the liquid within the evacuation chamber thereby entering a collection device in operable communication with the evacuation chamber.

The Hastings invention secures a chamber around the top of the mound. A probe connected to a water hose extends from the top of the chamber to below the top of the mound and is used to inject water into the mound. As the mound is flooded with water, the water level will then rise above the ant mound and the ants will rise to the top. The water rises to an overflow port connected to a tube that extends below the opening in the chamber. At the end of this tube a mesh is used to filter out the ants and larvae from the water flow. Potential drawbacks include that the securing of the chamber warns ants by disturbing the colony. Using water at ambient temperature does not kill the ants, or larvae in place. It relies on them moving to the top of the mound and then floating to the top of the water. Ants have the possibility to aid in the queens and larvae escape through foraging tunnels. Water in the liquid state will not penetrate all of the tunnels. The tunnels water does penetrate will be at a slow rate that allows time for the ants to escape. This invention dislocates the ants, it does not kill them all.

U.S. Pat. No. 6,220,525 to McSherdon, 'Fire ant eradication apparatus,' discloses a fire ant eradication apparatus that comprises a tubular handle having a first end adapted for attachment to a pressurized water source and a second end. The apparatus further includes a conduit having proximal and distal ends relative to a user with the proximal end coupled to the second end of the handle for fluid transmission there between. A dispensing assembly is attached to the handle with the conduit extending there through. Insecticide is aspirated from the dispensing assembly into the conduit as water flows through the conduit. The conduit includes a plurality of longitudinally spaced apart nozzle assemblies for dispersing the insecticide from the conduit. The distal end of the conduit includes a point assembly having a cone section and a tip. The upper end of the cone section has a diameter greater than the diameter of the conduit such that the nozzle assemblies will not become clogged with soil as the apparatus is inserted into the ground.

The McSherdon invention comprises a long tube with holes drilled in the end to form a nozzle. The tube is connected to a water hose and a container full of poison. As water flows through the long tube, the poison is aspirated into the water stream. Potential drawbacks to this invention include the use of poisons, water in the liquid state will not penetrate all of the tunnels (as would water in the gas phase), the tunnels water does penetrate will be at a slower rate that allows time for the ants to escape, and the probe end is bigger than the nozzle portion of the tube which creates a flow path for the poison and water to spray upward on the operator.

U.S. Pat. No. 4,768,306 to Hilbun, 'Method and system for killing fire ants,' discloses a method and device for killing fire ants in a mound comprising a shroud which will fit over the mound and conform to the contour of the ground. The shroud is provided with a relief valve, a tube or hose for admitting an exhaust gas into the shroud and a handle for lifting the device. Exhaust gases directed into the mound and into cavities made by the fire ants will exterminate the ants.

In the Hilbun invention exhaust gas, generated from a combustion engine, is injected into a shroud that covers an ant bed. The shroud directs the exhaust gases into the ant mound. Potential drawbacks include the engine generates noise and vibration which alerts ants, the shroud warns ants and exhaust gases will not penetrate deeply into the mound because they are lighter than air and will tend to rise. The pressure generated and the seal created by the shroud is not sufficient to force the gas deep into the mound. Ants will be able to escape.

U.S. Pat. No. 4,637,161 to Turner, 'Apparatus for underground insect and animal extermination,' discloses a tubular ground probe that is provided for downward penetration into an underground habitat of insects or animals and the upper end of the probe is provided with inlet means for steam under pressure. A downwardly opening shield is provided on the lower portion of the probe and is slidable there along and the shield includes a side vent for venting steams erupting from the ground within the confines of the shield downwardly and outwardly from peripheral portion of the shield.

In the Turner invention a probe is used to inject steam underground. The probe is surrounded with a shield that has a fixed plate and guide on top with a central hole through which the probe passes. The shield has an exhaust tube extending from the side of the shield downward. A U-shaped tube is connected to a guide around the probe and above the shield and contains a second steam supply port. The ends of the U-shape tube are connected to one another via a cross member functioning as a manifold. The cross member has additional probes pointed downward. The upper portion of the U-shape tube has a handle and is used to independently push the manifold probes downward. Potential drawbacks include that it only applies to an injection mechanism, not to steam generation. The guide on top of the plate limits articulation of the shield in order to adjust to different ground profiles. The guide limits the tool to only a vertical insertion of the probe. A secondary manifold probe section requires an additional hose and equipment. The secondary manifold probes require a large steam generator in order to achieve sufficient pressure differential for dual or multiple injections. Secondary manifold probes the destroy mound prematurely facilitating early or premature breakout of steam. Once steam begins to escape, it will become the predominant path of steam travel thereby progressively limiting the dispersion of the steam out and away from the point of injection rather than into the mound. Secondary manifold probes require an operator to get close to the main probe in order to use the handle to force the probes downward. An operator's face is therefore close to the main probe and exposed. Secondary manifold probes are limited in their depth of penetration because the cross-member limits their lengths and also their depth of penetration. The invention is heavy and cumbersome for a residential operator to use.

U.S. Pat. No. 5,870,852 to Stanley, 'Non-toxic fire ant extermination means,' discloses a non-toxic fire ant extermination system providing probe injection of scalding water below ground level within a fire ant mound. The system includes a propane fueled water heater and water circulating pump capable of heating water in the range of 200 to 210 degrees Fahrenheit and of delivering the same at a flow rate of at least three gallons per minute which is effective to eradicate the insects within the core region of a fire ant mound. The injection probe features a cylindrical capture shield which is radially disposed about the probe and adapted for sliding attachment therewith being spring-biased in a downward direction against the surface of the ground during operation thereof to retain the intense heat generated by the process to capture fire ants emerging from the mound, and to protect the operator from the backflow of scalding water as the treatment proceeds. The injection probe is inserted below ground level and a continuous flow of scalding water is introduced into the mound as the probe is inserted further and slowly withdrawn until the hot water has penetrated throughout the core region of the mound complex. The fire ant extermination system is adaptable for use with any natural source of fresh water by use of a suitable filter system. In the alternative the system is adaptable to any municipal water supply having adequate water pressure in the range of 40 to 60 pounds per square inch.

The Stanley invention uses a cylindrical shield and injection probe to inject hot water below surface. The shield has a 90-degree corner for injection on corners of structures and a 180 side for injection near walls. Water is supplied via an electrical pump to a pre-heater, then a super-heater, both of which are fueled by propane. Potential drawbacks include that the hot water only limits lateral and upward dispersion. Gravity acts to pull the water down. The water has a higher viscosity than steam and does not flow as easily throughout the ant mound structure. The hot water used in the Stanley invention is at a lower temperature) (200-210° as opposed to 275-350° with steam. No allowance for steam is disclosed in the Stanley invention, and no chamber or water void area where steam would be generated is disclosed. The invention requires expensive equipment such as a pre-heater, super-heater, circulating pump and a power supply for a pump. The large amount of equipment requires mounting on a pallet which must then be transported by motorized vehicle. A motorized vehicle generates vibrations and noise which alarms ants and allows the queen to escape. The cylindrical shield adds weight and bulk to system making it difficult and cumbersome for residential user to lift and move, especially when trying to use the 90° or 180° sides of the shield. In order to use 90° or 180° sides of shield, it must be moved when it is hot risking operator to burns. Shield design limits the probe to near vertical injection only.

SUMMARY OF THE INVENTION

The present invention provides a method, apparatus and system for a self-contained unit used to generate and inject super-heated steam into an imported fire ant mound via an injection probe. The device is used to generate and inject steam throughout the entire honey-combed structure of the ant mound killing the queen, larvae and worker ants. It is designed to be compact and adapt easily to domestic residential use. The compact design allows for ease of mobility because great strength is not required, it is simply moved by hand using a dolly or cart.

The present invention provides a method, apparatus and system for treating fire ant mounds. The invention comprises a pressure vessel for holding water and steam, a water-heating circuitous pipe network for heating water and a steam-heating circuitous pipe network for heating steam. A heat source contemporaneously heats the water-heating circuitous pipe network, the steam-heating circuitous pipe network and the pressure vessel. Steam is generated, superheated and is supplied to a probe containing counter-sunken ports for applying steam to fire ant mounds. A sliding hammer to aid insertion and extraction may be fixed to the probe. An articulated protective shroud attached to the probe remains in contact with the ant mound surface.

BRIEF DESCRIPTION OF THE DRAWINGS

Objects and features of the present invention will become apparent from the following detailed description considered in connection with the accompanying drawings disclosing embodiments of the present invention. It should be understood, however, that the drawings are designed for the purpose of illustration only and not as a definition of the limits of the invention. For a detailed understanding of the present invention, references should be made to the following detailed description of an exemplary embodiment, taken in conjunction with the accompanying drawings, in which like elements have been given like numerals in the drawings, wherein similar reference characters denote similar elements throughout the several views:

FIG. 11 illustrates a nozzle provided by the present invention.

Figure 1:
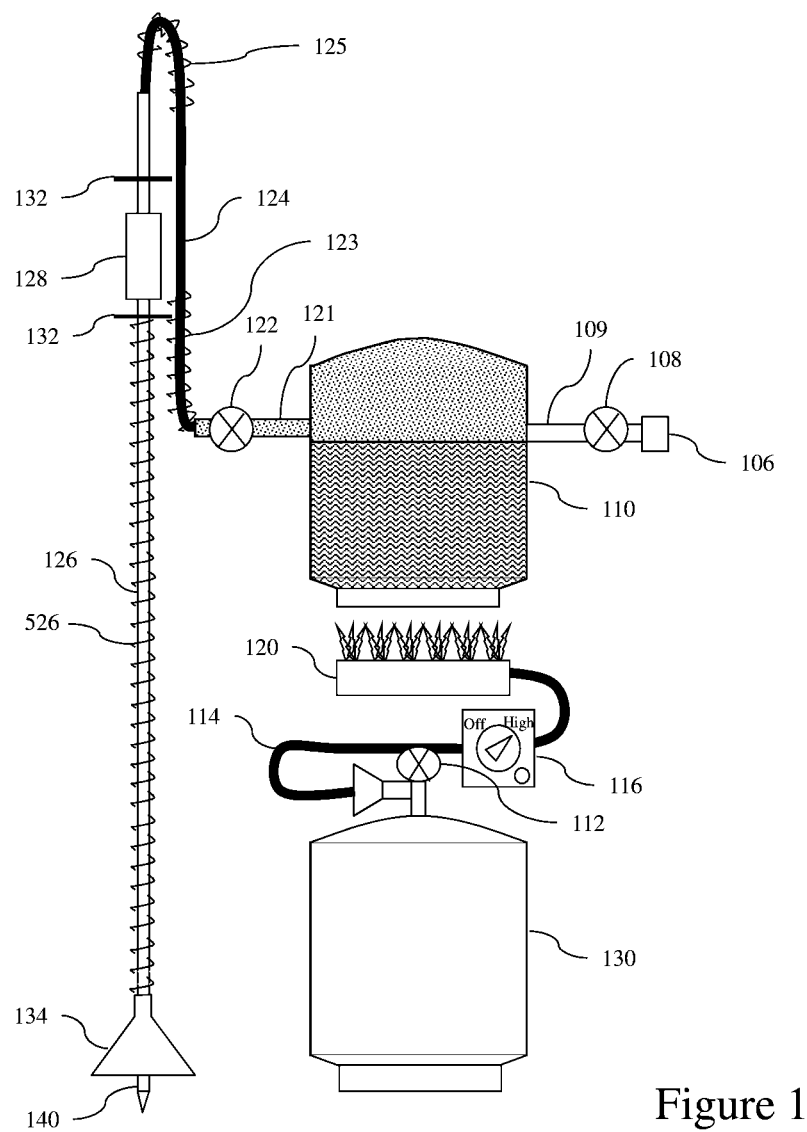
FIG. 1 illustrates a schematic view of an apparatus provided by the present invention.

While the invention will be described in connection with its preferred embodiments, it will be understood that the invention is not limited thereto. It is intended to cover all alternatives, modifications, and equivalents that may be included within the spirit and scope of the invention, as defined by the appended claims.

DETAILED DESCRIPTION OF THE INVENTION

In view of the above, the present invention through one or more of its various aspects and/or embodiments is presented to provide one or more advantages, such as those noted below. The present invention provides for elimination of fire ant colonies.

The present invention provides for a completely self-contained unit used to generate and inject super-heated steam at a temperature of 275-350° F. via a probe into an imported fire ant mound. The unit comprises a water tank, a heat source, circuitous pipe network and manifolded heating system, control devices, control panel, safety devices and an injection system. The heat source may be a combination propane burner and fuel supply tank or an electrical resistance heating system. The injection system comprises a ported injection probe, control valve, steam supply hose, a protective shroud or cone and hammer/driver mechanism to aid insertion or extraction of the probe. The components may be mounted on a dolly or small cart.

The present invention is designed to quickly kill the queen before the mound is warned and she is allowed to escape. The invention is ideal for domestic/residential use and will prevent long term hazards to children, pets or the environment.

Upon application of superheated steam provided by the present invention, the steam spreads throughout the honeycombed structure of the ant mound killing the queen, larvae and worker ants. The invention provided is designed to be compact and easy to use for domestic residential use. The compact design allows for ease of mobility and great strength is not required, it is simply moved by hand. It does not require the use of a small tractor, ATV, trailer or motorized vehicle as with other prior art methods of liquid or steam applications. This method, apparatus and system of the present invention eliminates the need for conventional extermination methods of poisoning. Poisoning presents a hazard to household pets, small children and the environment. By using steam, a natural inert fluid is used to kill the ant infestation. After the steam has completed its purpose of killing the fire ants, all that remains is water. There are multiple benefits of utilizing steam. First is that steam, being a gas travels easily and quickly throughout an ant mound. Because it is under pressure, it will travel in all directions at a high rate of speed and dispersion. It flows freely and easily because as a gas it has a viscosity on the order of $\frac{1}{100}^{th}$ (0.015 cp) that of just plain fresh-water (1 cp). Secondly, as the steam inside the mound naturally cools, the steam will coalesce into hot water which will then, through the force of gravity travel down into the lower recesses of the ant mound and continue killing as it goes because it still retains a high temperature. It will flow freely also because as a result of the conversion of water to steam, the surface tension in the water has been removed which would have prevented the freer flow of water due in part to capillary pressure effects. Furthermore the steam also heats up the surrounding area inside a mound which will kill the ants with heat even in the event the insertion of the probe has blocked access to any tunnels and pathways.

As steam is effectively applied to the mound, the ants are killed instantly, thereby blocking passageways of escape. This not only impedes the escape of the queen and ants, but once passage ways are completely blocked, it forces the ants to seek alternate routes of escape increasing the probability of contact and ancillary and collateral effects of steam through contact time and alternate routes being chosen. The blocking of the tunnels by the dead ants also acts as a diverter to further disperse the steam throughout the mound. Observations have shown fire ants literally "boiling" up out of the mound split seconds before they curl up in death until the hole becomes blocked. The steam will then begin to disperse at a higher rate down other passageways that in turn will "erupt" in dead ants as well thereby repeating the entire process. Excavation of the mound after treatment has shown the queen, worker ants, larvae, winged male and females dead inside the tunnels and chambers.

Poison is an alternative to the use of the present invention to treat fire ants. Poisons such as DDT, malathion and chlordane have been outlawed or their use highly restricted. Poisons must remain in or near the mound for a period of time in order to be effective and quite often have long-term deleterious effects. In a residential environment this presents a hazard to children, pets, native species, natural enemies of the fire ant and the environment.

Poison manufacturers recommend the treatment of ant mounds in the spring and the fall. These are the times when the ants are most active as a result of the temperature and rain which has softened and hydrated the soil. As a result, the queen will live nearer the surface of the mound. The spring and fall is also the time when new queens are produced and leave the mound to mate in the air with male ants. These queens subsequently move to a different location to establish a new colony. This is the period of time where the worker/foraging ants will feed and support both the current colony but also the new and growing female queens. The feeding of the queen with poison bait or the contact of the queen with a sufficiently poisoned ant is the means by which the ant mound is killed with poisoning. The worker ant is required to carry the poison, placed on top of the mound, bring it back queen's location and feed/contact the queen with the poison. The increased feeding of queens primarily takes place in the spring and in the fall. Therefore, to be the most effective, poisoning must take place during these two seasons. The present invention can be used year round to kill the queen for it does not require the "cooperation" of the worker and foraging ants. Another bad side effect of poisons, not just the bait type but sprays as wells, is that they indiscriminately kill native species of insects and animals which are natural enemies to the fire ants. Finally poisons are very susceptible to rain and watering, which will wash away the poison from the mound where it is most needed. The poison then ends up in creeks and public waterways poisoning the environment instead of the intended villain, the fire ant.

Previous "non-poison" methods require a cart and trailer pulled behind a tractor, ATV or other mechanized vehicle. This generally precludes residential use. The noise and vibration generated by a large vehicle will prematurely scare and disturb the ant mound causing an alarm resulting in the emergency evacuation and subsequent survival of the queen. The queen must be killed in order to eliminate the ant mound and prevent re-infestation. The killing of the workers only will not eliminate the ant mound, but it will place an incredible strain on the colony. The killing of the larvae adds to this strain as well because not only are the required workers eliminated, but the back-up larvae are prevented from developing, requiring the queen to start all over again with the production of eggs. If the queen is not killed on the first treatment, a follow-up treatment may be required. The second treatment will be more effective because there are less ants and larvae in the already weakened colony.

In several of the figures presented herein various components of the present invention are illustrated schematically for the sake of clarity without a superstructure or other support that may be useful for arranging components together. It will be appreciated that a conveyance like a dolly or two-wheeled cart may supply a superstructure for attaching components of the present invention in various embodiments. Also, when the present invention is implemented, protective coverings and heat shields (not shown) may be applied as well.

An embodiment provided by the present invention is illustrated in FIG. 1. A boiler 110 has a water line-in hose 109 connection 106 in proximity to a back pressure valve or manual valve 108. The water connection valve 106 may fit any of many conventional hose or faucet fittings. The valve 108 has a one-way check valve to allow water into the boiler tank. The boiler 110 is situated relative to a heating element, for example the gas burner 120. Fuel for the gas burner 120 is supplied by the fuel reservoir 130, which may be a propane tank. The propane tank has a control valve 112 allowing fuel to pass to a fuel line 114 leading to a flow control valve 116 for regulating gas supplied to the gas burner 120.

The line out 121 from boiler 110 contains a manual valve 122 attached to hose 124 leading to probe 126. Optional sliding hammer 128, which may be a weighted pipe or pieces of concentric pipe in combination, wraps around probe 126 between two impact plates 132 attached to probe 126. A protective shroud which may be any of several shapes, for example a cone 134, is attached near the distal end of probe 126 in proximity to a nozzle 140 attached to the probe 126 distal end. Cone 134 may be attached as an articulated or gimbaled connection to the probe, and further moveable with a spring 526 operable to keep the protective cone in contact with the ground thereby creating a sealed environment under the cone 134 when the nozzle 140 is inserted into a mound or the earth. It is a feature of the articulated cone 134 that probe 126 may be inserted into the earth at a variety of angles while the bottom circumference of cone 134 remains in contact with the earth.

Figure 2:
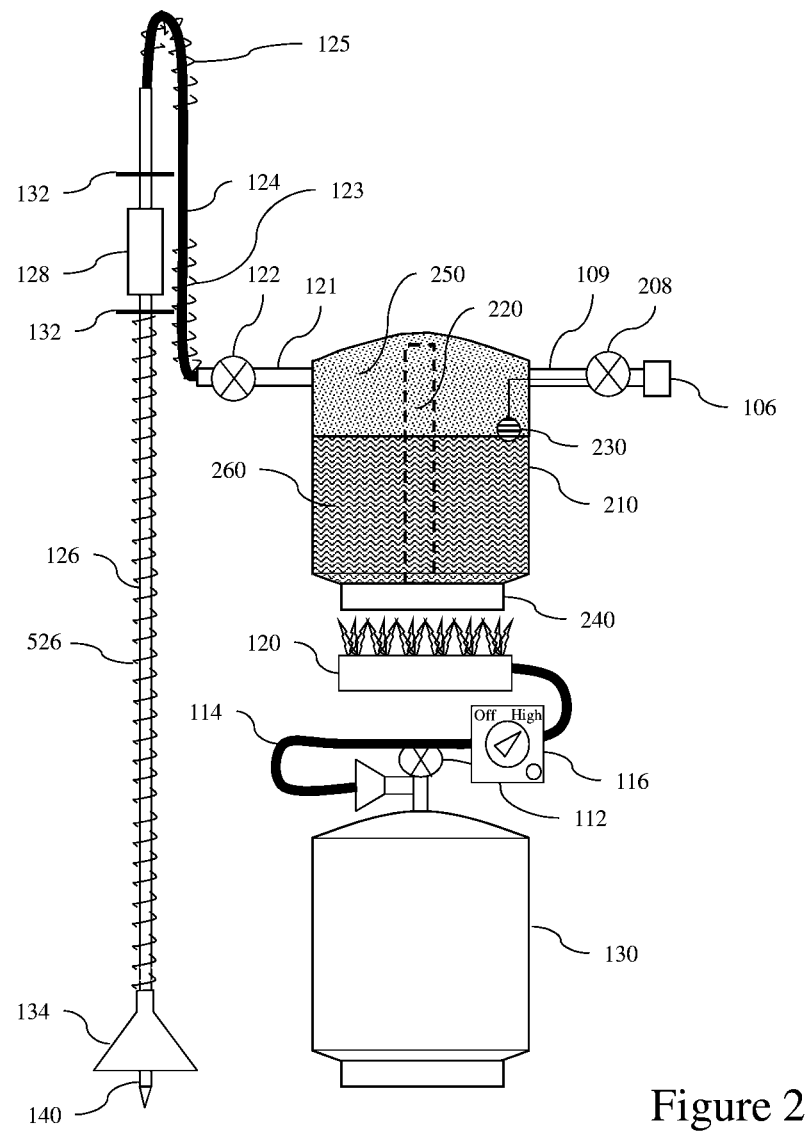
FIG. 2 illustrates an alternative schematic view of an apparatus provided by the present invention.

Another embodiment provided by the present invention is illustrated in FIG. 2. A pressure vessel, for example a water heater tank 210, has a water line-in hose 109 connection 106 in proximity to a back pressure valve or manual valve 208. Optionally valve 208 is an auto fillup valve that works in conjunction with a water level indicator 230 by being operably connected such that water entering through water connection 106 will fill to a certain level of the pressure vessel 210 and then water flow will be shut off. The diagram labeled FIG. 2 illustrates one form of an auto-fillup valve and drawn for illustrative purposes only. Therefore the form of the auto-fillup valve is not necessarily limited to the form shown in FIG. 2. The water heater 210 is situated relative to a heating element, for example a gas burner 120. Fuel for the gas burner 120 is supplied by the fuel reservoir 130, which may be a propane tank. The propane tank has a control valve 112 allowing fuel to pass to a fuel line 114 leading to a flow control valve 116 for regulating gas supplied to the gas burner 120.

Water heater tank 210 may have a hollow tube 220 in the center that allows for a greater surface area to impart heat into the water heater tank 210. The longitudinal hollow tube may be open or closed on the top. As water 260 is heated, steam 250 may be generated in the area above the water 260. Optionally a heat retention plate 240 may be attached to the underside of the water heater tank 210.

The line out 121 from water heater tank 210 contains a manual valve 122 attached to hose 124 leading to probe 126. Optional sliding hammer 128 wraps around probe 126 between two impact plates 132 attached to probe 126. A protective cone 134 is attached near the distal end of probe 126 in proximity to a nozzle 140 attached to the probe 126 distal end. Cone 134 may be attached as an articulated or gimbaled connection to the probe, and further moveable with a spring 526 operable to keep the protective cone in contact with the ground thereby creating a sealed environment under the cone 134 when the nozzle 140 is inserted into a mound or the earth.

Figure 3:
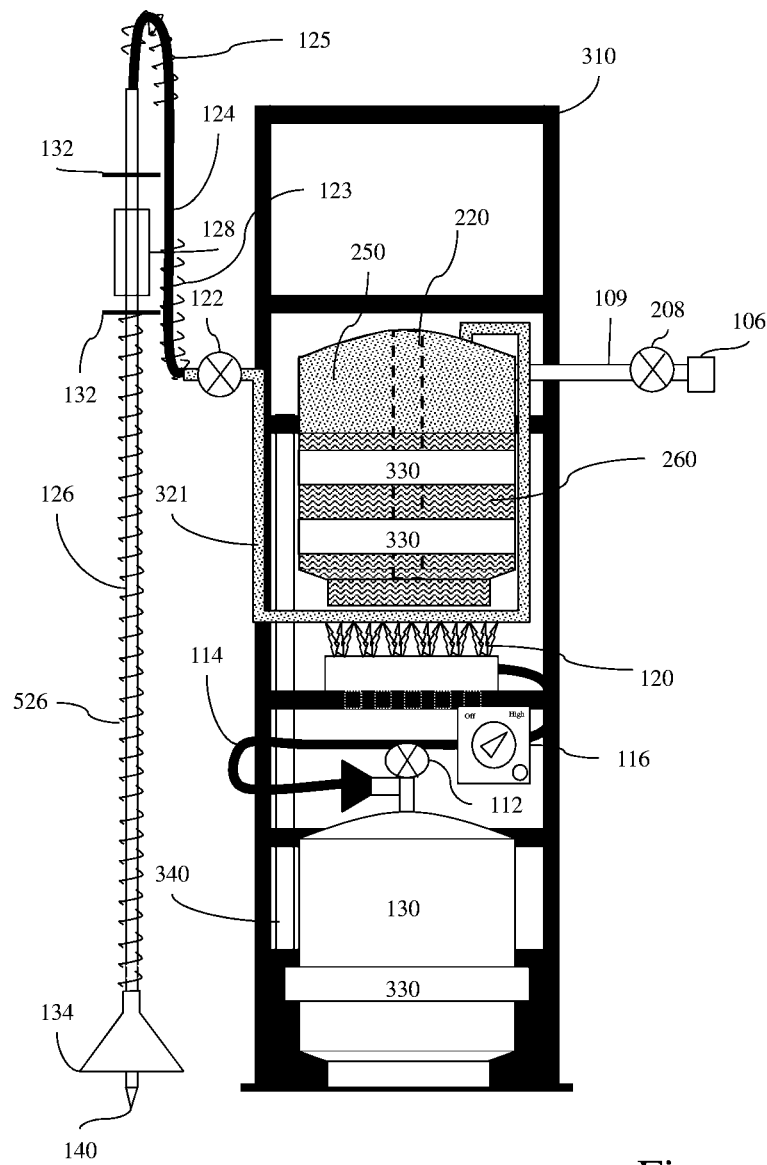
FIG. 3 illustrates an example of an apparatus provided by the present invention as mounted on a two wheel dolly.
Figure 4:
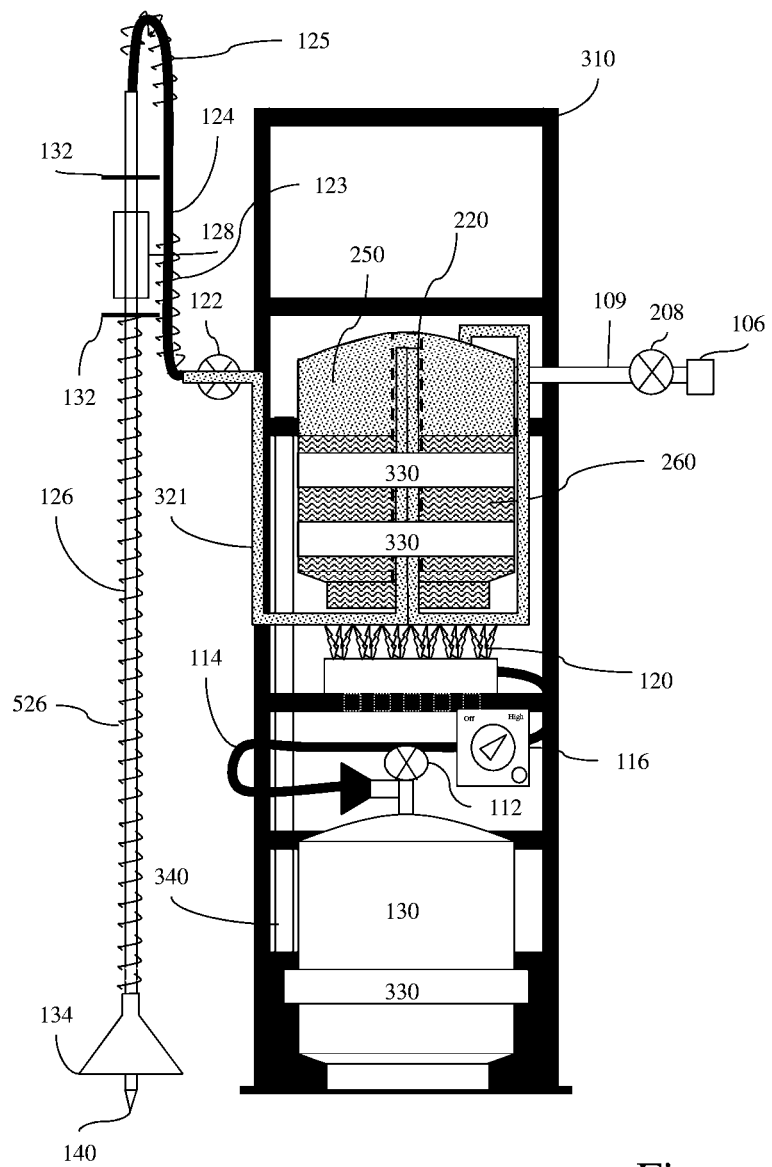
FIG. 4 illustrates an alternative example of an apparatus provided by the present invention as mounted on a two wheel dolly.
Figure 5:
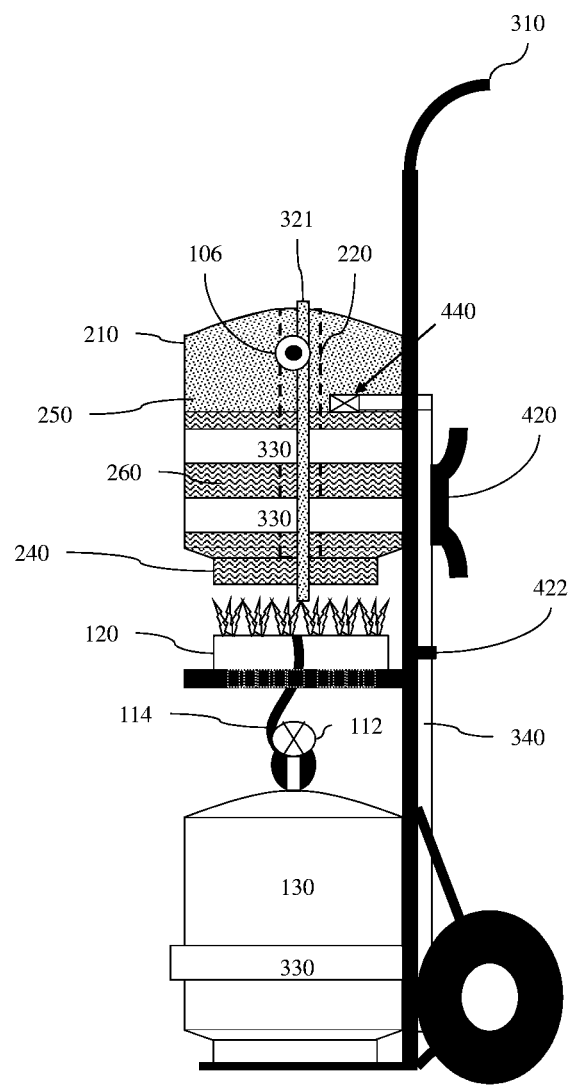
FIG. 5 illustrates a side view of an example of an apparatus provided by the present invention as shown in FIG. 3 and FIG. 4.

FIG. 3, FIG. 4 and FIG. 5 illustrate an embodiment of the present invention mounted on a two-wheel dolly 310. This embodiment will also easily adapt to a four wheel cart (not shown) or other conveyance. A water heater tank 210 has a water line-in 109 hose connection 106 in proximity to a back pressure valve or manual valve 208, or optionally valve 208 is an auto fill-up valve that works in conjunction with a water level indicator/detector 230 (as in FIG. 2). The water heater 210 is situated relative to a heating element, for example the gas burner 120. Fuel for the gas burner 120 is supplied by the fuel reservoir 130, which may be a propane tank. The propane tank has a control valve 112 allowing fuel to pass to a fuel line 114 leading to a flow control valve 116 for regulating gas supplied to the gas burner 120. Optionally, a flame starter mechanism for a propane heat source may be included. Automatic controls connected to temperature and pressure sensors, including a thermocouple, may be added to regulate the heat output from source 120.

Water heater tank 210 may have a hollow tube 220 in the center that allows for a greater surface area to impart heat into the water heater 210. As water 260 is heated, steam 250 may be generated in the area above the water 260. Optionally a heat retention plate 240 may be attached to the underside of the water heater tank 210. Plate 240 provides for storing and maintaining heat in proximity to the pressure vessel, the water heater tank 210.

Water heater tank 210 has a line out 321 for carrying steam. Line-out 321 passes through an area in proximity to the heat source 120 thereby super heating the steam. Optionally, line 321 could pass through the inside of the hollow tube thereby super heating the steam even further (FIG. 4). Line 321 contains a manual valve 122 attached to hose 124 leading to probe 126. Hose 124 may be rubber encased braided steel hose and has springs 123 and 125 for protection and structural support. Optional sliding hammer 128, which may be a pipe, wrapped concentrically around probe 126 between (two) impact plates 132 attached to probe 126. Sliding hammer 128 provides for aid in penetration or extrication of probe 126. Probe 126 may have the nozzle 140 attached, for example by threaded connection. A protective cone 134 is attached near the distal end of probe 126 in proximity to a nozzle 140 attached to the probe 126 distal end. Cone 134 may be attached with an articulated or gimbaled connection to the probe, and further moveable with a spring 526 operable to keep the protective cone in contact with the ground thereby creating a sealed environment under the cone 134 when the nozzle 140 is inserted into a mound or the earth. The cone 134 protects the user from steam and from ants.

FIG. 5 further illustrates a 'pop-off' or safety valve 440 that will provide for release of pressure in the pressure vessel 210 should pressures reach dangerous levels. Pressure is relieved through pop-off valve discharge line 340 which vents in a direction and to a predetermined area preferably near the ground (not shown) to ensure safety.

Figure 6:
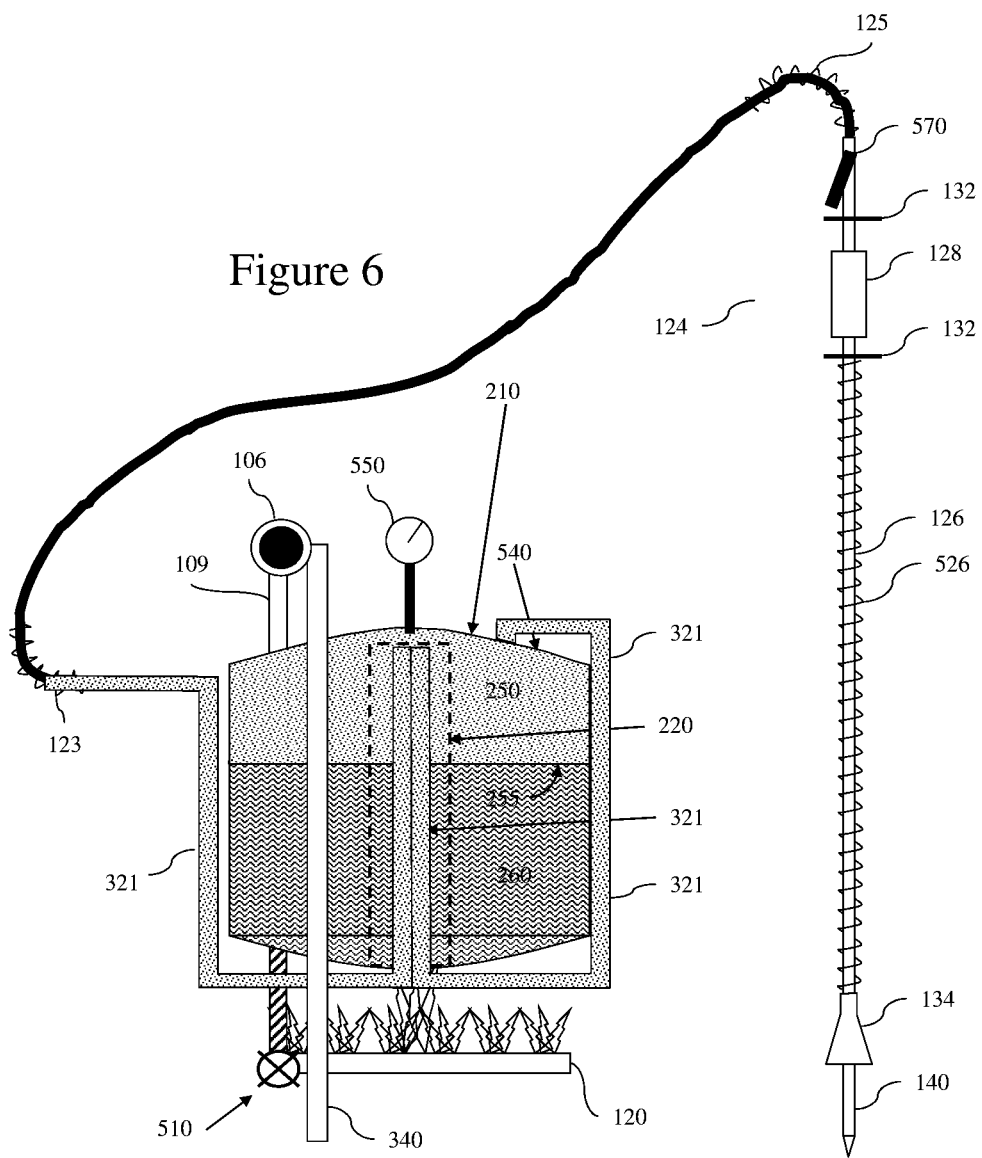
FIG. 6 illustrates an example of an apparatus provided by the present invention including additional pipe networking for super heating steam.

FIG. 6 illustrates a close-up view of FIG. 4 and FIG. 5.

Optional means for moving the invention may be provided by a dolly 310, cart or other mobile structure or platform on a roller or on wheels or casters for moving heavy objects. Hose storage 420 may be present as well as a probe clamp/hole 422 for storage.

Figure 7:
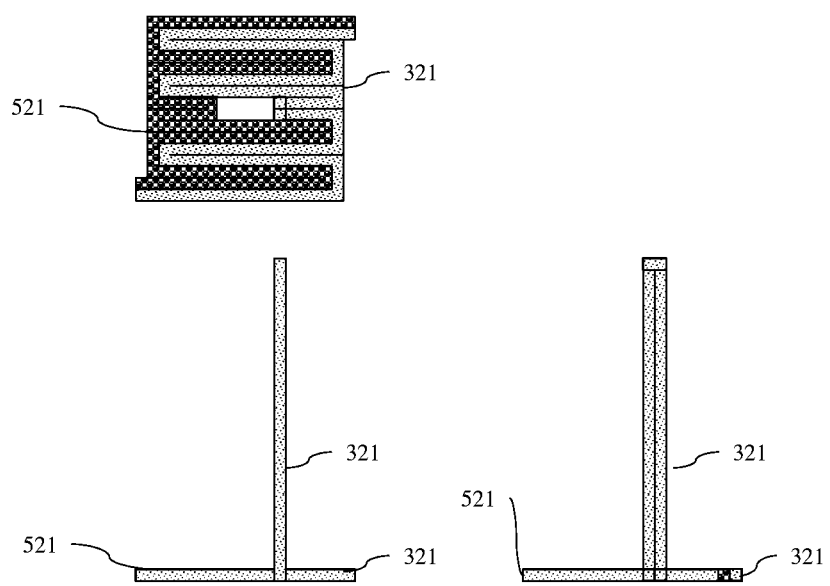
FIG. 7 illustrates an example of an apparatus provided by the present invention in the form of a circuitous pipe network in both the water lines for heating water and lines for super heating steam.
Figure 8:
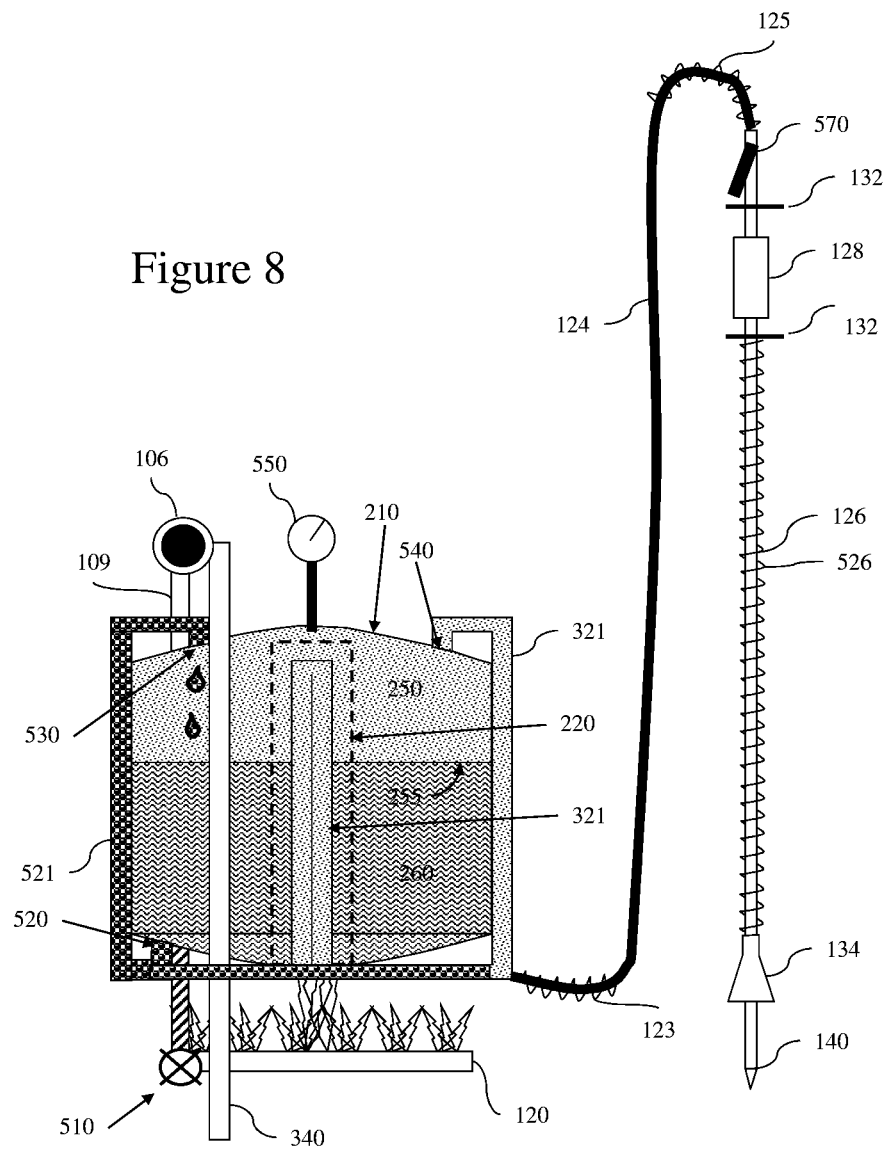
FIG. 8 illustrates an example of an apparatus provided by the present invention including the circuitous pipe network in the water lines for heating water and super heating steam.

FIG. 7 illustrates one possible example of a circuitous pipe network/inter-meshed pathway in the water-heating line 521 and steam-heating line 321 for heating water and super heating steam. FIG. 8 illustrates an embodiment of the present invention with the water-heating circuitous pipe network 521 and steam super-heating circuitous pipe network 321 incorporated. Pressure vessel 210 contains a hollow tube 220, water 260 and an area 250 above the water line 255 where steam is generated. Pressure in the vessel 210 may be monitored with a pressure gauge 550.

Water is heated in the main body of the water-heating circuitous pipe network 521 or portions thereof of, that are in proximity to the heat source 120. The heat source 120 heats both the water in the water-heating circuitous pipe network 521 as well as the pressure vessel 210. Water may enter the water-heating circuitous pipe network 521 at Port 2 520 near the bottom of the pressure vessel 210, flow through the water-heating circuitous pipe network portion of water line 521 near or in the heat source 120 and enters the top of the pressure vessel 210 at Port 3 530 as water or steam. A valve at Port 1 510 allows for fluid to be evacuated from the vessel 210 manually, optionally with a foot operated attachment, for example after use of the present invention.

Port 4 540 is above the water level inside the pressure vessel 210. Steam enters Port 4 540 and steam line 321. Steam in line 321 passes through or in proximity to heat source 120 as steam-heating circuitous pipe network 321 is inter-meshed with the water-heating circuitous pipe network 521 so that the steam becomes superheated before entering line 124 and traveling through line 124 to spring-wrapped probe 126. Optionally, part of steam circuitous pipe network 321 is routed circuitously into the hollow tube 220 of pressure vessel 210 so that heat transfer to the superheated steam is maximized prior to steam entering line 124. Heat source 120 contemporaneously heats pressure vessel 210 and the water circuitous pipe network 521 and steam circuitous pipe network 321, as well as the portion of 321 that traverses hollow tube 220.

Figure 9:
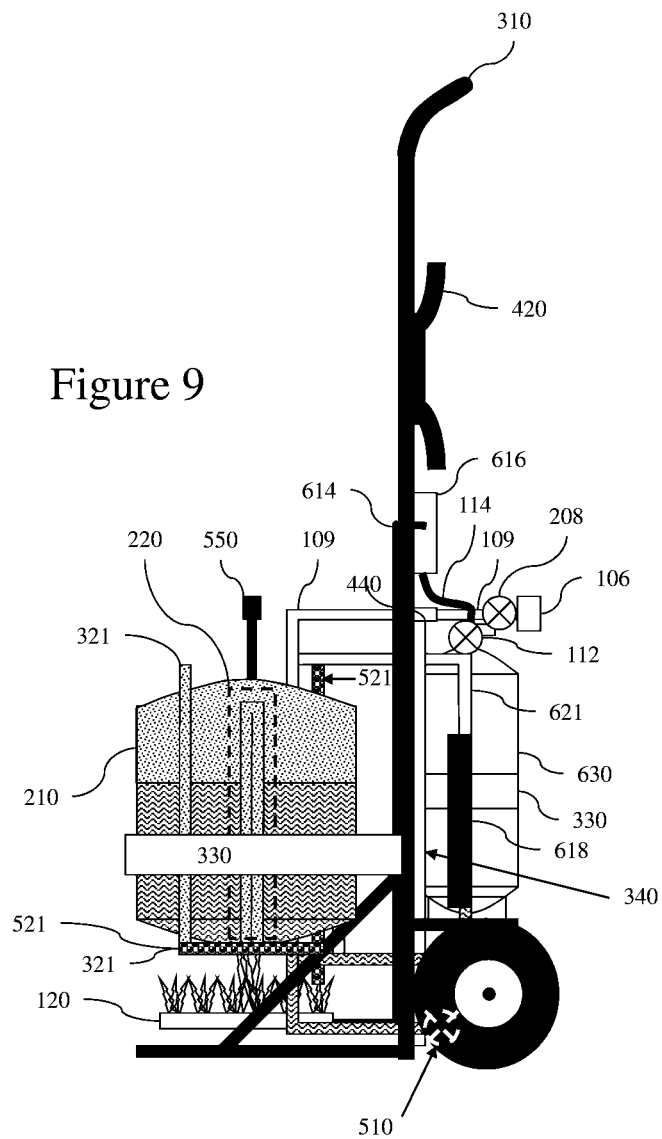
FIG. 9 illustrates an example of a dolly-mounted apparatus provided by the present invention including a circuitous pipe network in the water lines for heating water and super heating steam.
Figure 10:
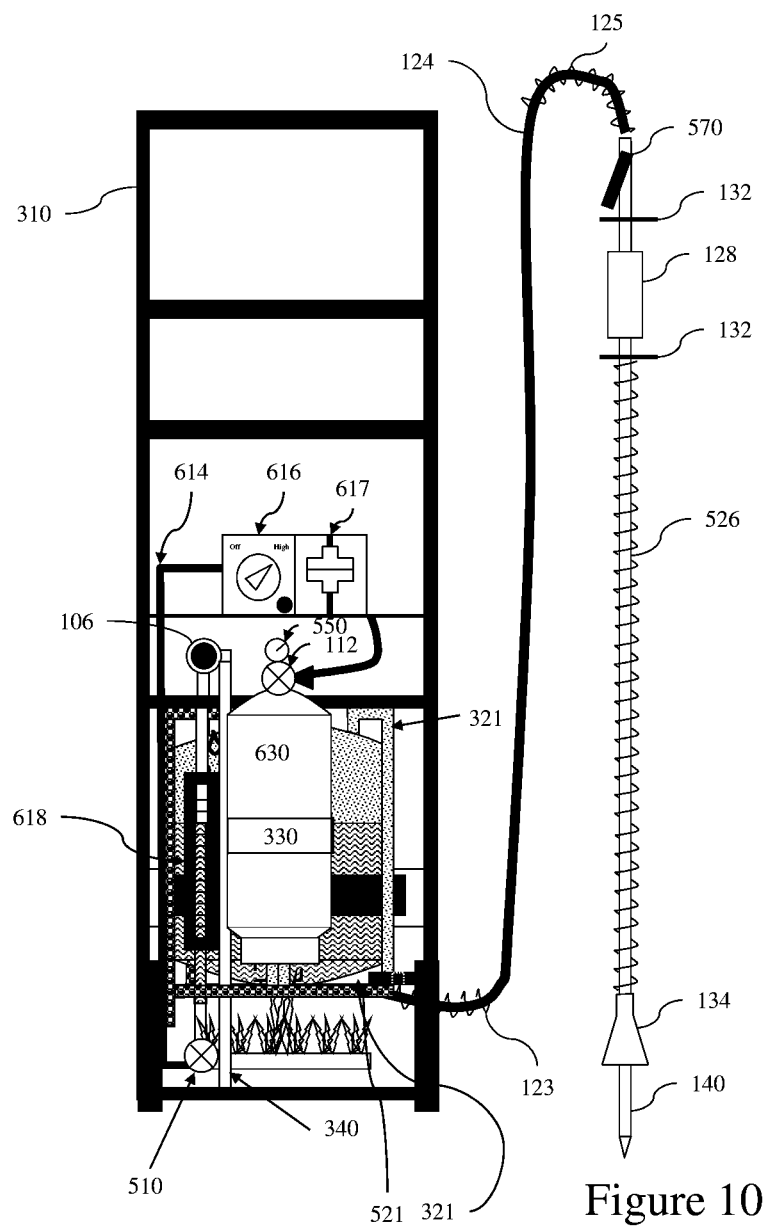
FIG. 10 illustrates an alternative view of an apparatus provided by the present invention.

FIG. 9 and FIG. 10 illustrate another embodiment of the present invention mounted on a two-wheel dolly 310. This embodiment is also easily adaptable to other conveyance means. Water heater tank 210 has a water line-in 109 hose connection 106 in proximity to a back pressure valve or manual valve 208, or optionally valve 208 is an auto fill-up valve that works in conjunction with a water level indicator/detector 230 (as in FIG. 2). The water heater 210 is situated relative to a heating element, for example the gas burner 120. Fuel for the gas burner 120 is supplied by the fuel reservoir 630, which may be a propane tank. The propane tank has a control valve 112 allowing fuel to pass to a fuel line 114 leading to a flow control valve 616 for regulating gas supplied to the gas burner 120 through fuel line 114. Water heater tank 210 may have a hollow tube 220 in the center that allows for a greater surface area to impart heat into the water heater 210.

The present invention provides a pressure vessel 210 (a water tank or water heater tank) that may be on the order of 2-5 gallons in size, a heat source (a propane burner), an energy source (a propane tank), a water-heating circuitous pipe network 521 and a steam-heating circuitous pipe network 321, insertion probe 126 with 140, control device 570, safety devices 134, 440, 550, 340 and optionally, a mobile structure used to move the invention. Mobile structures include a dolly 310 and/or cart for mobilization. The pressure vessel may be bracket mounted 330 on the mobile structure. The pressure vessel 210 may be mounted above the base of the carrier so as to allow sufficient room for the installation of a heat source (propane burner) below. Next to the water tank a propane tank is installed with a mounting bracket that allows quick installation and removal as needed for re-filling purposes. Examples of fuel tanks are propane tanks that can be a small tank the size of an acetylene bottle used in welding with a modified valve to utilize conventional/residential propane hookups, and a propane tank commonly used in residential gas grilling. Fuel tanks may be separated from other components by an insulated fire-wall (for example, fire proof insulation sandwiched between two plates of light-gauge steel or aluminum) to protect the propane tank from the open flame or other heat source. Depending on how many mounds are to be treated, the water tank may be filled with water from ¼-¾ full. Some void space 250 above the water in the pressure tank is required to provide sufficient volume for steam generation, containment and pressurization. The tank should be of sufficient size so that as the steam is injected into the mound, the rate of injection does not lead to insufficient steam generation or too rapid steam depletion. If the tank is overfilled, then only a small volume could be used for steam containment resulting in insufficient volume to maintain preferred injection pressures of 30-50 psi. The pressure could decrease too quickly. The generated pressure, developed by the heating process, is sufficient to inject the steam at a high rate into the ant mound. This eliminates the need for pumps, electricity or an external power source as with prior art methods and makes the present invention more easily portable in ways not achievable with prior art inventions.

The pressure vessel 210 (water tank) may have a 3 to 4 inch hollow tube 220 running substantially longitudinally within the vessel used for heating. The hollow tube 220 may be open at one end and may extend nearly the entire length of the vessel. This tube may be closed or domed at the top. This creates a heating path through the inside of the pressure vessel and thereby exposes more surface area of the pressure vessel to the heat source (propane burner 120) which accelerates the heating process and maintains pressure.

Returning to FIG. 8, the pressure vessel has four ports for managing the flow of fluids and gases. These ports are arbitrarily numbered herein 1 (510) and 2 (520) on bottom and numbers 3 (530) and 4 (540) on top. Port #1 (510) is connected to a discharge tube which contains a manual valve located at foot level and is used to bleed off the pressure and steam in case of emergency or termination of use. Port #2 (520) is connected to a length of copper tubing. The first section of the tubing runs circuitously around or through the burner (FIG. 8). The remaining section goes back (line 521) to the top of the tank where it is manifolded with Port #3 (530). As the tank is filled, water will flow through Port #2 (520) and fill up the water-heating circuitous pipe network section of the copper tubing. As the burner 120 heats up the bottom of the tank and the water inside, the water-heating circuitous pipe network is also heated. Since the tubing of the water-heating circuitous pipe network is made up of copper it heats up the water inside the tubing quickly because copper has a high rate of heat transfer. As the water inside the tubing is heated and even brought to a boil, the newly formed steam and boiling water will flow through the water-heating circuitous pipe network to the top of the tank where it is added back into the tank through Port 3 530. This process substantially increases the rate of heat exchange/transfer to the water and thereby reduces the time required to bring the tank of water to boiling. The boiling water and generated steam will primarily flow the described direction because the water inside the tank creates a hydrostatic head or back pressure forcing the lighter fluid in the circuitous pipe network (water and steam) to travel in the described direction. This heating circuit/cycle dramatically accelerates the heating process, maintains a higher water temperature above that required for boiling, and thereby decreases the time required for a single heating cycle. This heating process is continued until the pressure builds up to a minimum of 50 psi. This pressure allows for the application of steam injecting at a sufficiently high rate. Secondly, as the steam is released during the injection process, the tank maintains an injection pressure of 30-50 psi. If the steam is injected at a lower pressure, the pressure may bleed off more quickly than the machine generates sufficient steam and thereby decrease the injection rate. This is because according to the rudimentary form of the Ideal gas Law PV=T (P—pressure, V—Volume, T—temperature), pressure is directly proportional to temperature. Therefore at the Higher Pressure of 50 psi, the temperature within the system is higher as well. As the pressure is released through the injection process, the latent temperature within the liquid water is still at the same temperature as it was prior to injection. The higher temperature within the liquid water converts the water to steam quickly requiring less additional heat from the burner to sustain the system's operating conditions.

Port #4 (540) is used to withdraw the steam from the top of the pressure vessel. Steam travels through copper tubing 321 back to the bottom of the tank where it goes through the steam-heating circuitous pipe network which also surrounds the burner. This process elevates the temperature of the steam even further. The steam then travels through a final section of tubing which passes inside the previously described hollow tube 220 in the pressure vessel. Since this tube is exposed to the direct flame of the burner, the steam goes through a final superheating cycle. Once the steam passes this section, it then goes out and through a high pressure/high temperature rubber encased braided steel hose 124. A secondary hose, consisting of a thermal rubber impregnated with a braided fire retardant fiber, covers the primary hose for additional thermal insulation, and thermal protection. The steam then exits this hose, passes through an injection valve 570 where steam flows through a steel injection probe ¼-⅜" with an inside diameter 840 with a pointed nozzle (140 or 140') on the end. FIG. 11 illustrates nozzle 140 with regular ports 820 and nozzle 140' with ports 830 that are countersunk to inhibit plugging when the nozzle is inserted into the earth. The nozzle may have threads 810 for attaching to the probe. The diameter of the nozzle is the same size or smaller than the diameter of the injection tube. The nozzle may be of a manufacture with a 75-80 degree profile/point on one end with five—$\frac{5}{32}^{nd}$ ports drilled into it, but these dimensions may be varied. One port may be at the very end to give the nozzle a single downward injection port 824, while the remaining ports (e.g., four) are spaced at 90 degrees from one another laterally. One inch above the nozzle on the injection probe itself are four to eight additional $\frac{5}{32}^{nd}$ ports. These ports are drilled two at a time, on a 1" spacing, 180 deg out of phase with one another. Each set of two subsequent holes are drilled 1" higher and 90 deg out of phase from the previous two. This results in a spiraled injection profile.

The injection valve 570 at the top of the probe is thermally insulated such that the user will not be burned. Furthermore it contains a mechanism by which the valve can be kept in the open position during the injection process, thereby relieving the operator from having to stand by the mound and hold the valve open. Once the application of steam injection starts, as expected, ants began to try and flee the mound. Some ants do escape and will, due to their function and role within the ant colony, attempt to attack the operator. Therefore it is imperative that the operator have the opportunity to step away from the mound to avoid attack.

Port #3 (530) is also manifolded with a back pressure/pressure relief valve. Water is allowed to flow into the tank for filling purposes, but a check valve prevents the water and steam from escaping. This valve has a "T" configuration which allows the steam/water pressures to be released if the water temperature and/or pressure reach a pre-set limit via a piping system which extends to the bottom of the device at foot level. This valve also possesses a water hose connection 106 on one end so a water hose can be connected directly to the tank and used to fill up the tank with water.

Another feature is that a removable funnel/cone, which is an articulated shroud or cone 134, is placed on the end of the steam injection probe. Above and connected to the cone is a compression spring 526 with a very low compression rating. The shroud or cone 134 surrounds the probe 126 and prevents steam and dirt escaping from the mound from blasting or hitting the operator thereby protecting them. As the probe is injected deeper into the ant mound, the spring, which may be subsequently compressed, ensures that the protective cone stays in contact with the top of the mound. Furthermore as the probe is withdrawn, the spring maintains the position of the cone 134 in contact with top surface of the mound. The top of the cone 134, though sealed, has sufficient diameter and/or gimballing so as to allow the cone to articulate around the injection probe 126 thereby allowing it to adjust itself to different profiles on the ground and thereby also allows injection of the probe 126 at angles other than vertical.

On top of the spring, in between it and the injection valve 570 a weighted concentric tube 128 exists that is used as a form of an optional sliding hammer or impact driver. A relatively small diameter tube, larger than the diameter of the injection probe, is surrounded with a 2 to 3 inches diameter tube. The top and the bottom are sealed and the void space between the outside of the inner tube and the inside of the outer tube is filled with a weighting material such as lead. This weighted mechanism is placed in between the injection handle and above the section possessing the compression spring. Two metal stops 132 are placed just above the compression spring and just below the injection valve 570 at a spacing of approximately 1 ft. The weighted handle 128 can than be used as a hammer to pound the rod into the mound and or out of the mound. Therefore a person of any size or strength can inject the probe 126. An alternate form can be made by taking a solid steel rod of 2-3" diameter and drilling a hole with a diameter slightly larger than that of the injection probe, lengthwise. This feature is predominantly for use around fixed objects or structures because by the mere design of an ant colony being a honey-combed maze of inter-connected tunnels, the mound itself is usually easily penetrated with minimum force.

Inter-connected with the heating circuitous pipe network may also be a sight glass 618 or fluid level indicator attached with water line 621. As the tank is filled with water, the operator is able to view the fluid level in order to determine the amount of water needed for the desired scope of operation. On the side of the device is an optional placard with a chart describing the amount of water required given the size and number of mounds to be treated. This feature can also incorporate an auto-fillup up system to automatically fill the tank to a predetermined water level, once the water level in the tank has been lowered to a predetermined level. This helps prevent the tank from being heated without water inside the tank and secondly not require the operator to manually perform the operation as well.

Interconnected with the sight glass or fluid level indicator are an optional water hose fill-up manifold and an auto-fill valve. This valve will automatically open when the water level reaches its lower limit and fill the tank to its upper adjustable limit. This feature may be included when extended operations are required and affords the operator the benefit of not having to repeatedly connect and fill-up the water tank.

A display and control panel may be prominently displayed. This display contains a steam tank pressure gauge, a manually operated flame igniter for the burner, and a manual gas valve. Once the valve on the top of the gas supply tank is opened, the manual gas valve located on the control panel is turned to the open position. Down stream of this valve is an optional pressure operated flame control valve 617. This valve is interconnected to the pressure gauge and opens/closes to increase or lower the size and intensity of the flame, based upon the pressure in the system so as to maintain the prescribed operating pressure.

The present invention provides a method, apparatus and system for treating fire ant mounds. The invention comprises a pressure vessel 210 for holding water and steam, a water-heating circuitous pipe network for heating water over a portion of a water line 521 and a steam-heating circuitous pipe network for heating steam over a portion of a steam line 321. A heat source 120 contemporaneously heats the water-heating circuitous pipe network, the steam-heating circuitous pipe network and the pressure vessel 210. Steam is generated, superheated and is supplied to a probe for applying steam to fire ant mounds. Superheating of steam may occur in a longitudinal hollow tube 220 containing a portion of the steam-heating circuitous pipe network. A nozzle containing countersunken ports may be attached to the probe. A sliding hammer to aid insertion and extraction may be fixed to the probe. An articulated protective shroud attached to the probe remains in contact with the ant mound surface.

An alternative method of heating water and steam for the present invention is through the use of electrically resistant coils using common household 110V electricity. First the water inside the tank is heated with an electrical heating element located near the bottom of the tank. Secondly, both the primary water-heating copper circuitous pipe network and the secondary steam super-heating circuitous pipe network are heated with the same heating element.

In one embodiment, the electrically resistant coil is wrapped around both the water-heating circuitous pipe network and the steam-heating circuitous pipe network, which in turn are contained inside an insulated container. The electric coil contemporaneously heats the water tank, the primary water-heating circuitous pipe network as well as the steam-heating circuitous pipe network.

Secondly, the copper water-heating and steam-heating circuits themselves may be contained in a matrix block of heat transferring material like cast aluminum. The block in turn is heated by the electrically resistant coils. Finally, both the matrix block and the circuitous pipe networks are contained inside an insulated container. The water tank may be above, and be in direct contact with, this matrix block which aids in the heating of water inside the tank.

Drawings are not to scale, but simply illustrations of the various designs. Multiple variations are possible within the scope of the invention. Some may be a water-heater tank only, the use of a heating plate at the bottom of the tank to aid in heat retention, a water tank only, a small size commercial boiler fueled by a propane tank, a single discharge line that passes and carries the steam directly through the flame before entering the discharge hose and nozzle, or even a boiler that is electrically???? heated. These examples are by no means completely inclusive, but given as an example of the scope of variance within the invention.

While various embodiments have been shown and described, various modifications and substitutions may be made thereto without departing from the spirit and scope of the invention. Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. An apparatus for treating fire ant mounds comprising:
    (a) a pressure vessel for holding water and steam;
    (b) a water-heating circuitous pipe network for heating water, the water-heating circuitous pipe network connected with an entry port near the bottom of the pressure vessel for water entering from the pressure vessel and a circuitous pipe network exit port near the top of the pressure vessel, the circuitous pipe network adjacent to the pressure vessel;
    (c) a steam-heating circuitous pipe network for heating steam, the steam heating circuitous pipe network connected with a steam heating coil entry port near the top of the pressure vessel, the steam heating circuitous pipe network at least partially adjacent to the water heating circuitous pipe network;
    (d) a heat source for heating the water-heating circuitous pipe network, the steam-heating circuitous pipe network and the pressure vessel
    (e) a heat source adjacent to the water heating circuitous pipe network for heating the water heating circuitous pipe network, the steam heating circuitous pipe network and the pressure vessel; and
    (f) an insertion probe for applying steam to fire ant mounds, the probe attached to the steam heating coil.

2. The apparatus of claim 1 wherein the insertion probe further comprises at least one selected from the group consisting of: i) a sliding hammer, ii) an articulated shroud and iii) an attached nozzle with countersunk ports.

3. The apparatus of claim 1 wherein the pressure vessel further comprises a hollow tube.

4. The apparatus of claim 3 wherein the steam heating circuitous pipe network traverses a portion of the hollow tube.

5. The apparatus of claim 3 wherein the steam heating circuitous pipe network traverses a portion of the hollow tube and connects to a line to carry steam to the probe.

6. The apparatus of claim 1 further comprising an auto-fillup valve operably connected to a water level indicator.

7. The apparatus of claim 1 wherein the heat source further comprises at least one chosen from the group consisting of: i) liquefied natural gas, and ii) electrically conductive coils.

8. A system for treating fire ant mounds comprising:
    (a) a pressure vessel for holding water and steam;
    (b) a water heating circuitous pipe network for heating water, the water heating circuitous pipe network connected with a water heating circuitous pipe network entry port near the bottom of the pressure vessel for water entering from the pressure vessel and a water heating circuitous pipe network exit port near the top of the pressure vessel, the water heating circuitous pipe network adjacent to the pressure vessel;
    (c) a steam heating circuitous pipe network for heating steam, the water heating circuitous pipe network connected with a water heating circuitous pipe network entry port near the bottom of the pressure vessel for water entering from the pressure vessel and a water heating circuitous pipe network exit port near the top of the pressure vessel, the water heating circuitous pipe network adjacent to the pressure vessel;

(d) a heat source for contemporaneously heating the water heating circuitous pipe network, the steam heating circuitous pipe network and the pressure vessel; and (e) an insertion probe for applying steam to fire ant mounds, the probe attached to the steam heating coil.

9. The system of claim 8 further comprising a longitudinal hollow tube in the pressure vessel.

10. The system of claim 9 wherein the steam heating coil traverses a portion of the hollow tube.

11. The system of claim 9 wherein the steam heating circuitous pipe network traversing a portion of the hollow tube connects directly to a line to carry steam to the probe.

12. The system of claim 8 wherein the heat source comprises at least one chosen from the list consisting of: i) liquefied natural gas, and ii) an electrically conductive coil.

13. The system of claim 8 wherein the insertion probe further comprises at least one selected from the group consisting of: i) a sliding hammer, ii) an articulated shroud and iii) an attached nozzle with countersunk ports.

14. The system of claim 8 further comprising an auto-fillup valve operably connected to a water level indicator.

15. A method for treating fire ant mounds comprising:
(a) heating with a heating source:
i) a pressure vessel for holding water and steam;
ii) a water heating circuitous pipe network for heating water, the water heating circuitous pipe network connected with a water heating circuitous pipe network entry port near the bottom of the pressure vessel for water entering from the pressure vessel and a water heating circuitous pipe network exit point near the top of the pressure vessel;
iii) a steam heating circuitous pipe network for heating steam, the steam heating circuitous pipe network connected with a water heating circuitous pipe network entry port near the top of the pressure vessel, wherein the pressure vessel is at least partially adjacent to the water heating circuitous pipe network and the steam heating circuitous pipe network; and (b) applying superheated steam to fire ant mounds with a probe attached to the steam heating coil.

16. The method of claim 15 wherein the insertion probe further comprises at least one selected from the group consisting of: i) a sliding hammer, ii) an articulated shroud and iii) an attached nozzle with countersunk ports.

17. The method of claim 15 wherein a portion of the steam heating circuitous pipe network traverses a portion of a longitudinal hollow tube in the pressure vessel connects directly to a steam line to carry steam to the probe.

* * * * *